Nov. 5, 1929.  A. S. HOWARD  1,734,467
MOTION PICTURE SCREEN
Filed May 24, 1928    3 Sheets-Sheet 1
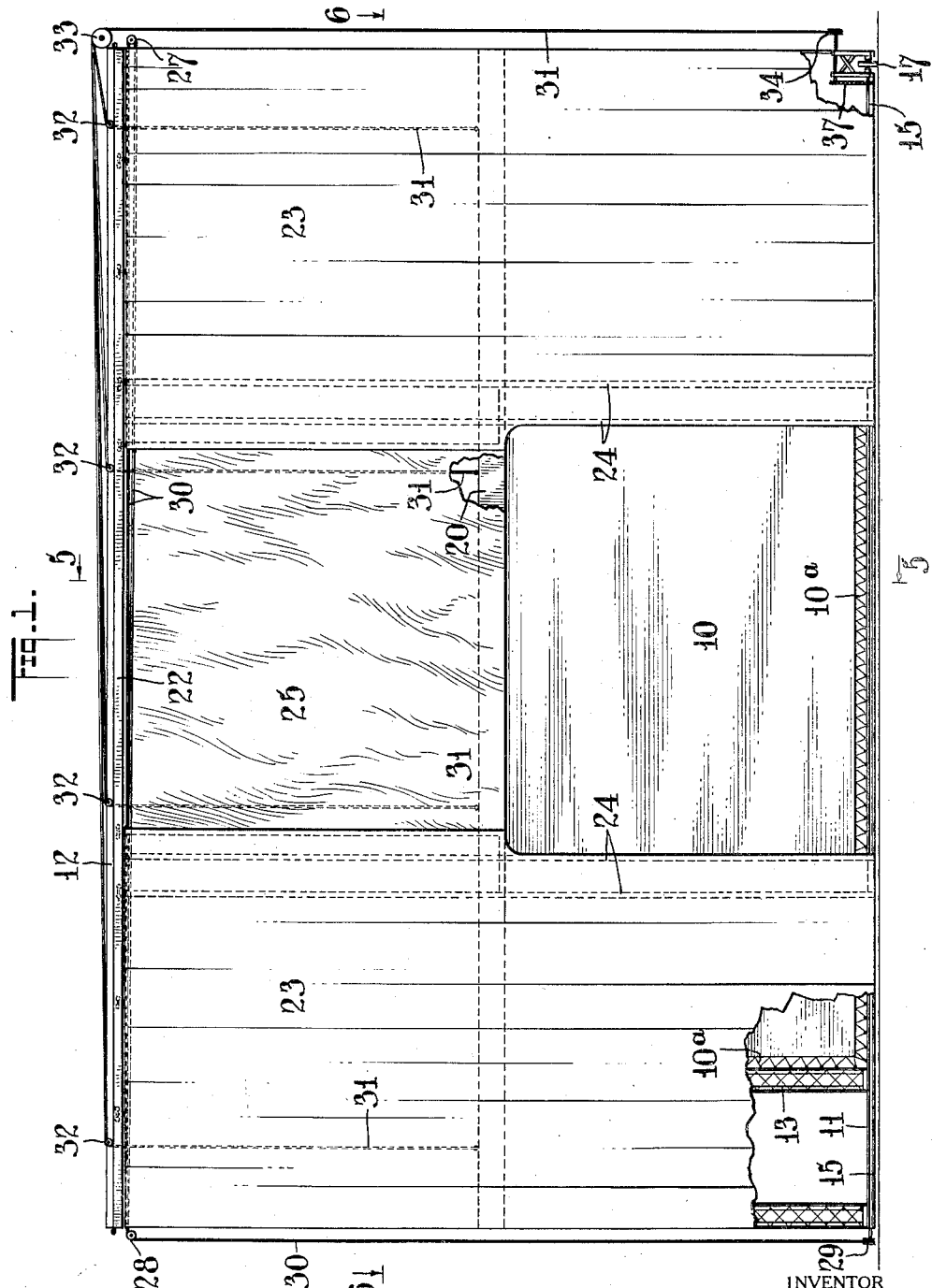
INVENTOR
Albert S. Howard
BY
Dean Fairbank Obrecht & Hirsch
ATTORNEY

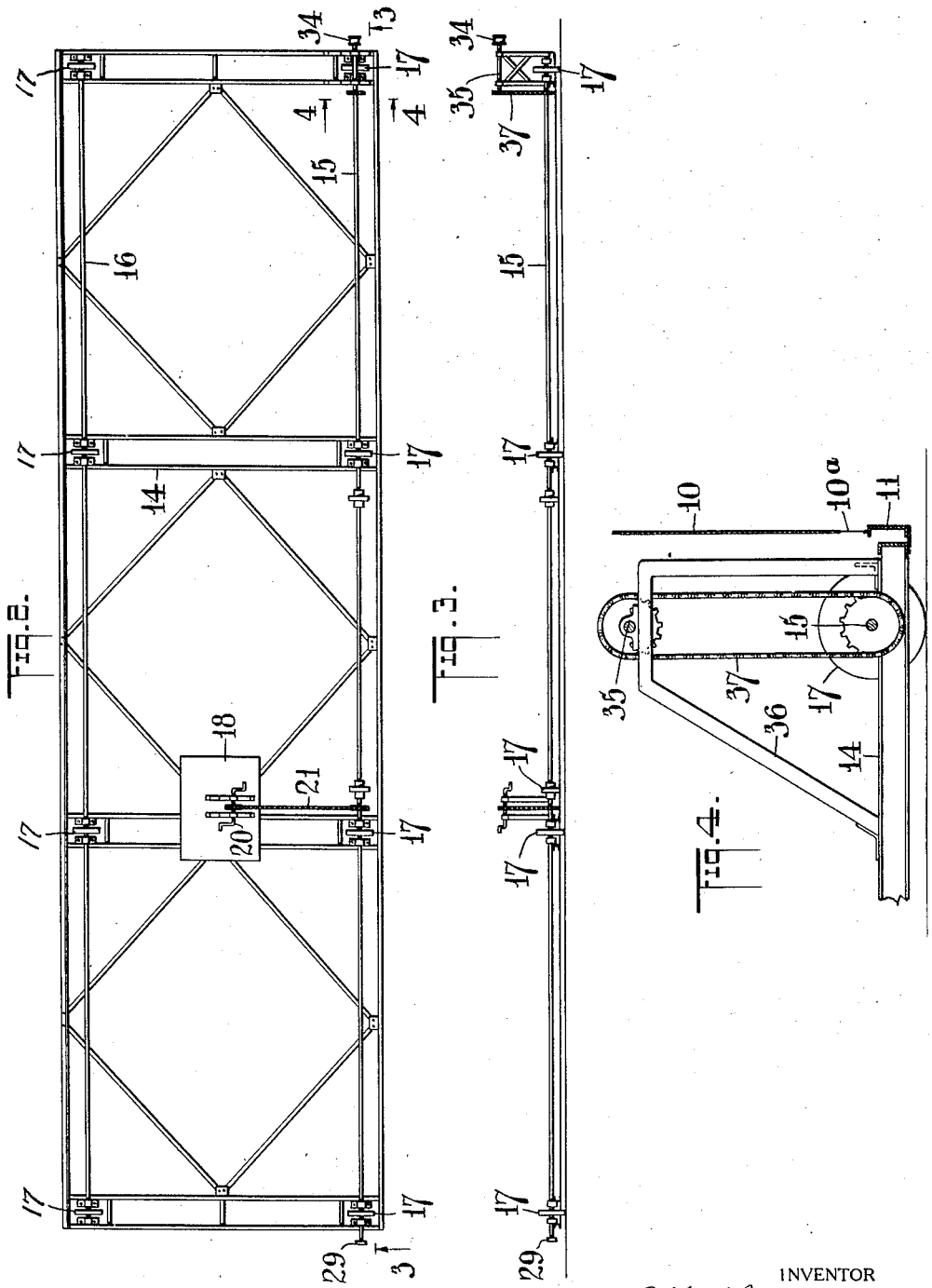

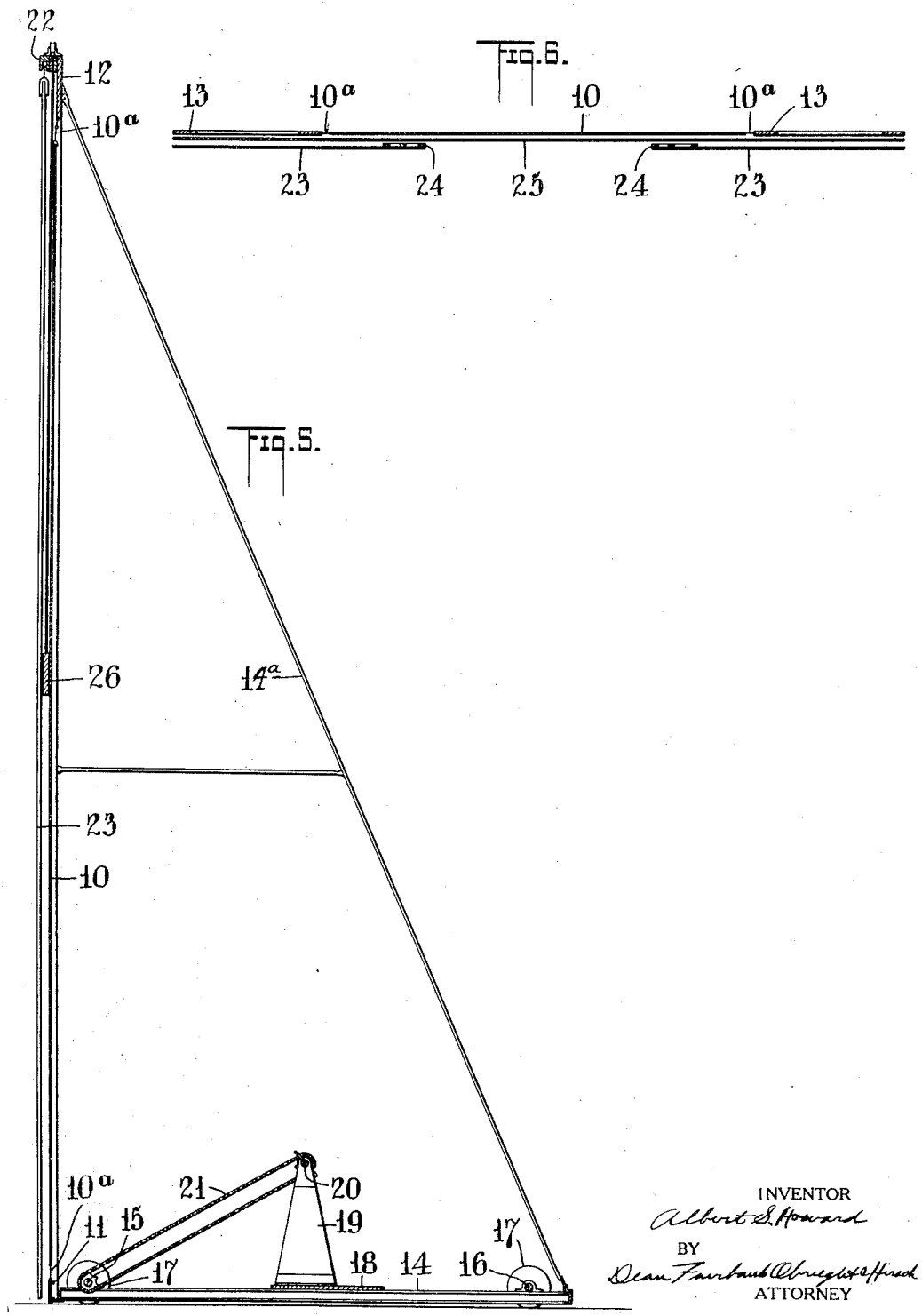

Patented Nov. 5, 1929

1,734,467

UNITED STATES PATENT OFFICE

ALBERT S. HOWARD, OF GREAT NECK, NEW YORK, ASSIGNOR TO JOSEPH R. VOGEL, OF NEW YORK, N. Y.

MOTION-PICTURE SCREEN

Application filed May 24, 1928. Serial No. 280,153.

In depicting action or a series of events by motion pictures it is often desired to give the impression that the person viewing the scene or action is moving forward. In other cases some of the scenes are taken at close range while others are taken at very long range.

I have discovered that novel and very striking results may be accomplished if, during the projection of the picture on the screen, the screen be moved bodily toward or from the audience depending upon the character of the action or setting or the distance of the camera from the scene at the time the picture was taken.

One of the main objects of my invention is to provide means whereby the screen may be moved at will so as to obtain the desired effect.

With various stage settings it has been common practice for a great many years to move side curtains and a drop curtain simultaneously so as to vary the effective size of the area exposed to the view of the audience. If a small scene be exhibited (either with a small stage setting and living actors or a screen and picture projection machine), the side curtains or masks may be pulled out from proscenium arch and a drop curtain or mask lowered, while if the action requires a large scene these curtains are moved in the opposite direction.

In some theatres this is not practical if the exhibited scene be on a screen unless said screen be at the front of the stage because if it is at the back of the stage, the side portions of the screen when the latter is enlarged to the maximum effective size, are not visible from some of the side seats in the auditorium.

Therefore when such curtains are used with a screen, it is customary to have the screen in a fixed position at the front of the stage.

Because of the fact that the rays of light diverge from the lens of the projecting machine to the screen, any bodily movement of the screen toward and from the spectators would ordinarily cause the picture to be smaller when the screen is up front than when it is at the back of the stage. Thus the desired effect of a receding scene, obtained by moving the screen toward the back of the scene during the projecting of the picture, would be counteracted to an extent by the accompanying enlargement of the picture and might even result in portions of the side of the picture getting out of the line of vision of a portion of the spectators.

As a further and important feature of my invention I provide means whereby the picture on the screen diminishes in size as the screen recedes from the spectators and increases as it approaches the spectators. This not only gives great realism to the picture as the actual picture increases rather than decreases in size as it approaches the spectators, but it also causes the entire picture to be visible to the spectators at all times.

A picture of the maximum size may be projected when the screen is at the front of the stage, where the entire screen is in the range of vision of all the spectators, while a smaller picture is projected when the screen is at the back of the stage and all portions of this smaller picture will likewise be in the line of vision of all the spectators.

In carrying out my invention the screen is mounted upon a carriage which may be moved back and forth on the stage, and at the same time it is provided with a masking apparatus which may operate on the general principle disclosed in the McKaye Patent 490,482 issued Jan. 24, 1893.

As an important feature of my invention the apparatus for operating the curtains or masking apparatus is coupled to the operating mechanism of the carriage so that said curtains are automatically moved back and the drop curtain lifted as the screen is moved forward and the side curtains are moved in or toward each other and the drop curtain is lowered as the screen is moved back.

In the accompanying drawings I have illustrated one embodiment of my invention, but it will be apparent that various changes may be made in the details of constructions without departing from the spirit of my invention or the scope thereof as defined in the appended claims.

In these drawings:

Fig. 1 is a front view of the apparatus as it appears when back stage and with the curtains pulled to reduce to a minimum the effective area of the screen;

Fig. 2 is a top or plan view of the carriage;

Fig. 3 is a front elevation of a portion of the operating mechanism viewed in a plane indicated by the line 3—3 of Fig. 2;

Fig. 4 is an end view of the portion of the carriage shown in front elevation and on a smaller scale at the right hand end of Fig. 3;

Fig. 5 is a vertical section on the line 5—5 of Fig. 1; and

Fig. 6 is a portion of a horizontal section on the line 6—6 of Fig. 1.

In the construction illustrated the screen 10 is supported in a substantially vertical plane by a metal frame including a base member 11, a top member 12, and side members 13. The screen may be held taut by connecting its edges to the frame by suitable lacing 10ᵃ.

This vertical frame is rigidly supported on a horizontal frame or base 14 which may be made in skeleton form from metal bars as shown particularly in Fig. 2. This frame carries front and rear axles 15 and 16 on which are mounted supporting wheels 17 so that the frame or base is closely adjacent to the stage floor, but may be rolled back or forth on the latter.

This base or frame with its supporting wheels thus constitutes a carriage for the screen, the frame of the screen being at the front edge of the carriage. The upper part of the screen carrying frame may be braced from the rear of the carriage by diagonal braces 14ᵃ.

For propelling the carriage back and forth on the stage floor any suitable propelling means may be employed. For instance, a platform 18 may be provided on which one or more men may stand and on a standard 19 on this platform may be provided a crank shaft 20 connected to the front axle 15 by a chain 21 and suitable sprocket wheels. Thus men standing on the platform may, by turning the crank shaft, move the screen back and forward at any desired rate or to any distance in accordance with signals from the projection man or stage manager.

At the top of the screen carrying frame there is provided a track 22 from which is suspended a pair of side curtains or masks 23. These are preferably of black fabric, but the front or inner edges may be stiffened or reinforced by cleats 24 shown in Fig. 6, and indicated in dotted lines in Fig. 1. The upper edge of the curtain may have rollers which may move along the track 22.

Also suspended from the top member 12 of the screen frame there is provided a drop curtain 25 which may be of similar black fabric and may have a reinforcing strip 26 on its lower edge.

Any suitable mechanism may be provided for operating these curtains and connecting the operating mechanism to the carriage propelling mechanism.

As shown the upper frame member of the screen carries a sheave 27 at one end and a pair of sheaves 28 at the other end, while the front axle 15 is provided with a sheave 29. An endless cord or wire 30 extends around the sheave 29, thence from one of the sheaves 28 lengthwise of the top of the frame, then around the sheave 27 back to the other sheave 28, and down to the sheave 29. There will thus be two substantially parallel runs of this cord along the top of the frame, and these will move in opposite directions when the carriage is moved and the sheave 29 is rotated. One of the curtains 23 may be connected to one run of the cord 30 and the other to the other run so that as the carriage moves in one direction, the two curtains 23 will be moved simultaneously toward each other, while when the carriage moves in the other direction the two curtains 23 will be pulled apart.

The lower edge of the drop curtain 25 may be connected to a plurality of cords 31 which may extend over sheaves 32 on the top frame member 12, and all of these cords may be connected together before or after passing over a sheave 33. They may all lead to a drum 34 driven from the front axle 15. As shown particularly in Figs. 3 and 4 this drum is mounted on a shaft 35 carried on a bracket 36 on the carriage, and the shaft is connected to the axle 15 by a chain 37 and suitable sprocket wheels.

It will of course be understood that the relative size of these sprocket wheels as well as of the drum and all of the sheaves for the several carriages will be so proportioned and connected as to give the desired relative movements of all of the parts.

The drop curtain will be raised or lowered at a speed directly proportional to the speed of the side curtains so that the exposed area of the screen will be kept of the proper and substantially uniform proportions. As the operating mechanisms for both the drop curtain and the side curtains are directly operated from the driving gear of the screen carrying carriage, it will be noted that in operating the device it is only necessary to pay attention to the bodily movement of the carriage at the proper time and rate and through the desired distance.

It will of course be understood that the operator of the projection machine so controls his machine by varying the focus and the size of the light aperture or in any other suitable manner so that the size of the picture will be kept in accord with the size of the exposed screen area and the picture will be kept in focus during the bodily movement of the screen.

Having thus described my invention what I claim as new and desire to secure by Letters Patent is:

1. An apparatus for exhibiting motion pictures including a screen, mask sections disposed adjacent thereto and movable to vary the exposed area of the screen, and a single means for simultaneously operating said mask sections and moving said screen in a direction at right angles to its plane.

2. An apparatus for exhibiting motion pictures including a carriage, a screen supported thereon, means for operating said carriage in a direction at right angles to the plane of the screen, and means operatively connected to said first mentioned means for simultaneously varying the effective area of the screen.

3. An apparatus for exhibiting motion pictures including a carriage, a screen carried thereby at the front edge thereof, said carriage having traction wheels with their axes parallel to the plane of the screen, whereby the screen may be moved in a direction at right angles to its plane, curtains normally concealing a portion of the front surface of the screen, and means operatively connected to said traction wheels for moving said curtains to vary the exposed area of the screen as the carriage is moved.

4. An apparatus for exhibiting motion pictures including a screen, and connected means for simultaneously moving said screen toward the spectators and increasing the effective area of the screen.

5. An apparatus for exhibiting motion pictures including a screen, means for moving said screen back and forth toward the spectators, and means connected to said last mentioned means for varying the effective size of the screen.

6. An apparatus for exhibiting motion pictures including a carriage having traction wheels, a screen supported by the carriage, a pair of curtains in front of the screen at opposite edges thereof, and means connecting said curtains and said traction wheels for moving the curtains toward each other upon bodily movement of the carriage in one direction.

7. An apparatus for exhibiting motion pictures including a carriage, a screen carried thereby, said carriage having traction wheels with their axes parallel to the plane of the screen, a drop curtain in front of said screen, and means operatively connecting said curtain and said traction wheels for raising the curtain upon the bodily movement of the carriage in one direction.

8. An apparatus for exhibiting motion pictures including a carriage having traction wheels, a screen carried by said carriage, a pair of side curtains in front of the screen, a drop curtain in front of the screen, means connecting said drop curtain and said traction wheels for raising and lowering the drop curtain during back and forth movement of the carriage in respect to the spectators, and separate means connecting said side curtains and said traction wheels for moving said curtains toward or from each other during movement of the carriage toward and from the spectators.

9. An apparatus for exhibiting motion pictures including a screen, a pair of side curtains in front of the screen, a drop curtain in front of the screen, and a single operating means for simultaneously moving said screen toward the spectators, pulling said side curtains apart and raising said drop curtain.

Signed at New York in the county of New York and State of New York this 22nd day of May, A. D. 1928.

ALBERT S. HOWARD.